(12) United States Patent
Chen

(10) Patent No.: US 8,435,096 B2
(45) Date of Patent: May 7, 2013

(54) DUST-PROOF STRUCTURE FOR MACHINE TOOLS

(75) Inventor: Bach Pangho Chen, Claremont, CA (US)

(73) Assignee: X'Pole Precision Tools Inc., Chung-Li, Taoyuan County (TW)

( * ) Notice: Subject to any disclaimer, the term of this patent is extended or adjusted under 35 U.S.C. 154(b) by 243 days.

(21) Appl. No.: 12/859,600

(22) Filed: Aug. 19, 2010

(65) Prior Publication Data
US 2011/0136419 A1    Jun. 9, 2011

Related U.S. Application Data

(63) Continuation-in-part of application No. 12/632,350, filed on Dec. 7, 2009, now Pat. No. 8,226,454.

(51) Int. Cl.
*B24B 23/00* (2006.01)
*B24B 55/02* (2006.01)

(52) U.S. Cl.
USPC .............................................. 451/7; 451/357

(58) Field of Classification Search .............. 451/7, 357, 451/359, 488, 449
See application file for complete search history.

(56) References Cited

U.S. PATENT DOCUMENTS

| | | | | |
|---|---|---|---|---|
| 5,018,314 | A | * | 5/1991 | Fushiya et al. ................. 451/357 |
| 5,392,568 | A | * | 2/1995 | Howard et al. ................ 451/357 |
| 5,595,531 | A | * | 1/1997 | Niemela et al. ................ 451/357 |
| 5,807,169 | A | * | 9/1998 | Martin et al. .................. 451/357 |
| 5,947,804 | A | * | 9/1999 | Fukinuki et al. .............. 451/357 |
| 6,780,094 | B2 | * | 8/2004 | Walker .......................... 451/356 |
| 7,270,598 | B2 | * | 9/2007 | Dutterer et al. ................ 451/357 |
| 7,699,687 | B2 | * | 4/2010 | Nordstrom ..................... 451/359 |
| 2009/0239453 | A1 | | 9/2009 | Nordstrom |

FOREIGN PATENT DOCUMENTS

| | | |
|---|---|---|
| CN | 2887526 Y | 4/2007 |
| TW | 517618 | 1/2003 |
| TW | M245007 | 10/2004 |
| TW | M261316 | 4/2005 |
| TW | M288839 | 3/2006 |

\* cited by examiner

*Primary Examiner* — Robert Rose
(74) *Attorney, Agent, or Firm* — Muncy, Geissler, Olds & Lowe, PLLC

(57) ABSTRACT

A dust proof structure for a machine tool includes a flow guiding element located therein. The machine tool includes a housing chamber to hold a spindle and the flow guiding element. The housing chamber has an air intake section and an air discharge section communicating with the air intake section. The machine tool further has an air inlet communicating with the air intake section and an air outlet communicating with the air discharge section. The spindle is coupled with an action member outside the air outlet. When the spindle drives the action member to operate, the flow guiding element introduces external air through the air inlet to the air intake section, and directs the air to the air discharge section to be discharged towards the action member. Hence dust generated by the action member during operation of the machine tool does not enter the machine tool through the air outlet.

4 Claims, 4 Drawing Sheets

DUST-PROOF STRUCTURE FOR MACHINE TOOLS

This application is a continuation-in-part, and claims priority, of from U.S. patent application Ser. No. 12/632,350 filed on Dec. 7, 2009 now U.S Pat. No. 8,226,454, entitled "HEAT DISSIPATING ARCHITECTURE FOR MACHINE TOOLS", the entire contents of which are hereby incorporated by reference.

FIELD OF THE INVENTION

The present invention relates to a dust-proof structure for a machine tool and particularly to a dust-proof structure to generate airflow in a machine tool during operation to avert dust contamination.

BACKGROUND OF THE INVENTION

Since electric motor was invented centuries ago, development and progress have been made constantly that bring great benefits to people's life. Originally, the electric motor was made in a large size for industrial purpose. Nowadays, numerous smaller electric motors are being made and used on household appliances and machine tools.

The conventional machine tools now being commonly used, such as grinder is driven by a motor for operation. During operation, dust is easily generated that affects working pieces or environment cleaning. To remedy this problem, many machine tools now on the market are equipped with a dust collection device to clear the dust generated during operation of the machine tools. For instance, R.O.C. patent No. M245007 discloses an air discharge apparatus for pneumatic grinders. It mainly includes a body with an upper extension portion and a lower extension portion juxtaposed on the circumference in an up and down manner. The upper extension portion has an air intake vent holding an air intake duct. The lower extension portion has a dust collection hood on a lower side with an opening and a grinding disk located in the opening. The grinding disk has dust suction vents. The lower extension portion further has one side coupled with a dust collection hose connected to a dust collection pouch. When the air intake duct introduces air to drive the grinder, the dust generated during grinding operation can be sucked through the dust suction vents and dust collection hood to enter the lower extension portion, then are introduced through the dust collection hose to enter the dust collection pouch coupled with the distal end of the dust collection hose.

R.O.C. patent No. 517618 also discloses an air discharge structure for pneumatic grinders that includes a grinding wheel equipped with dust suction vents and a dust cover on an upper end of the grinding wheel. The dust cover is fastened to a motor casing. The motor casing holds a pneumatic motor set equipped with a movable blade, and also has an air intake duct and an air expelled duct that are adjacent to each other and integrally extended from one side of the motor casing. The air intake duct and air expelled duct hold respectively an air intake valve set and an air discharge muffler set. The air intake duct and air expelled duct also have respectively a housing chamber to hold a throttle valve and a regulation knob, and two wings integrally extended from the top surfaces to hold a movable air intake trigger. The dust cover has a housing trough holding an air discharge duct pivotally connected to the motor casing. The housing trough is extended to a connection tube of the dust cover. The air discharge duct has an L-shaped duct with a flow guiding plate at a lower end. The air generated by the pneumatic motor can be discharged upwards through an air outlet. The duct has a lower end extended close to a front end of an outlet of the connection tube of the dust cover. Air discharge of the motor and outlet of the connection tube of the dust cover are converged. Dust generated during grinding can be quickly sucked by powerful discharged airflow. The regulation knob is located at the joint of the air discharge duct of the motor casing and air expelled duct and has an engraved portion and a wall portion to control air discharge route to selectively discharge the air through the air expelled duct or air discharge duct.

The aforesaid machine tools respectively clear dust through a dust collection duct installed at one side of the machine tool that collects the dust while the machine tool is in operation. However, dust generated during operation is introduced upwards into the machine tool through the grinding disk and dust collection hood, then enter the dust collection duct by the airflow direction of dust suction. As the dust advancing route is not a closed passage, the dust entered into the machine tool upward cannot be fully sucked into the dust collection duct. Moreover, the motor and cylinder of the machine tool also generate airflow during operation, thus the dust entered into the machine tool upward is easily accumulated in various crevices of the grinder or even inside the cylinder which drives the grinding disk to spin at high speeds. All these could cause damage of the elements of the machine tool.

SUMMARY OF THE INVENTION

The primary object of the present invention is to solve the aforesaid disadvantage by providing a dust proof structure for a machine tool to isolate dust from entering into a machine tool and prevent external dust from being sucked inside the machine tool following airflow to damage the machine tool.

To achieve the abovementioned object, the present invention proposes a dust proof structure for a machine tool. The machine tool has a housing chamber to hold a spindle and a flow guiding element. The housing chamber has an air intake section and an air discharge section communicating with the air intake section. The machine tool also has an air inlet communicating with the air intake section and an air outlet communicating with the air discharge section. The spindle is coupled with an action member outside the air outlet. When the spindle drives the action member to operate, the flow guiding element introduces external air through the air inlet to the air intake section, and also directs the air to the air discharge section towards the action member outside the air outlet to be discharged.

The machine tool according to the invention discharges the air from the interior towards the action member outside the air outlet so that dust generated during operation of the action member does not enter the machine tool through the air outlet. Therefore, the machine tool can maintain in a clean condition inside and prevent elements inside from being contaminated by the dust and damaged. As a result, the lifespan of the machine tool increases.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
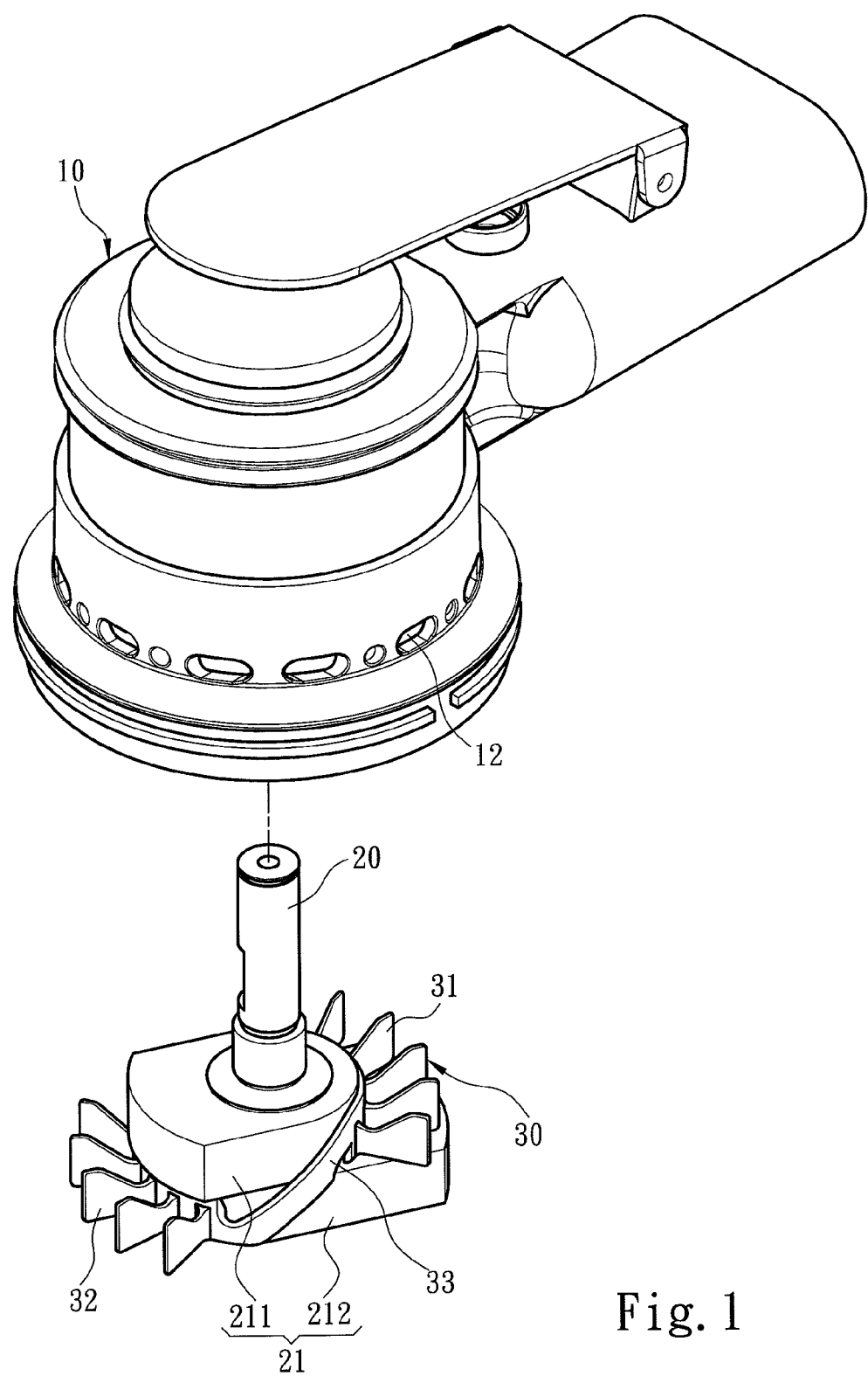
FIG. 1 is an exploded view of the invention.
Figure 2:
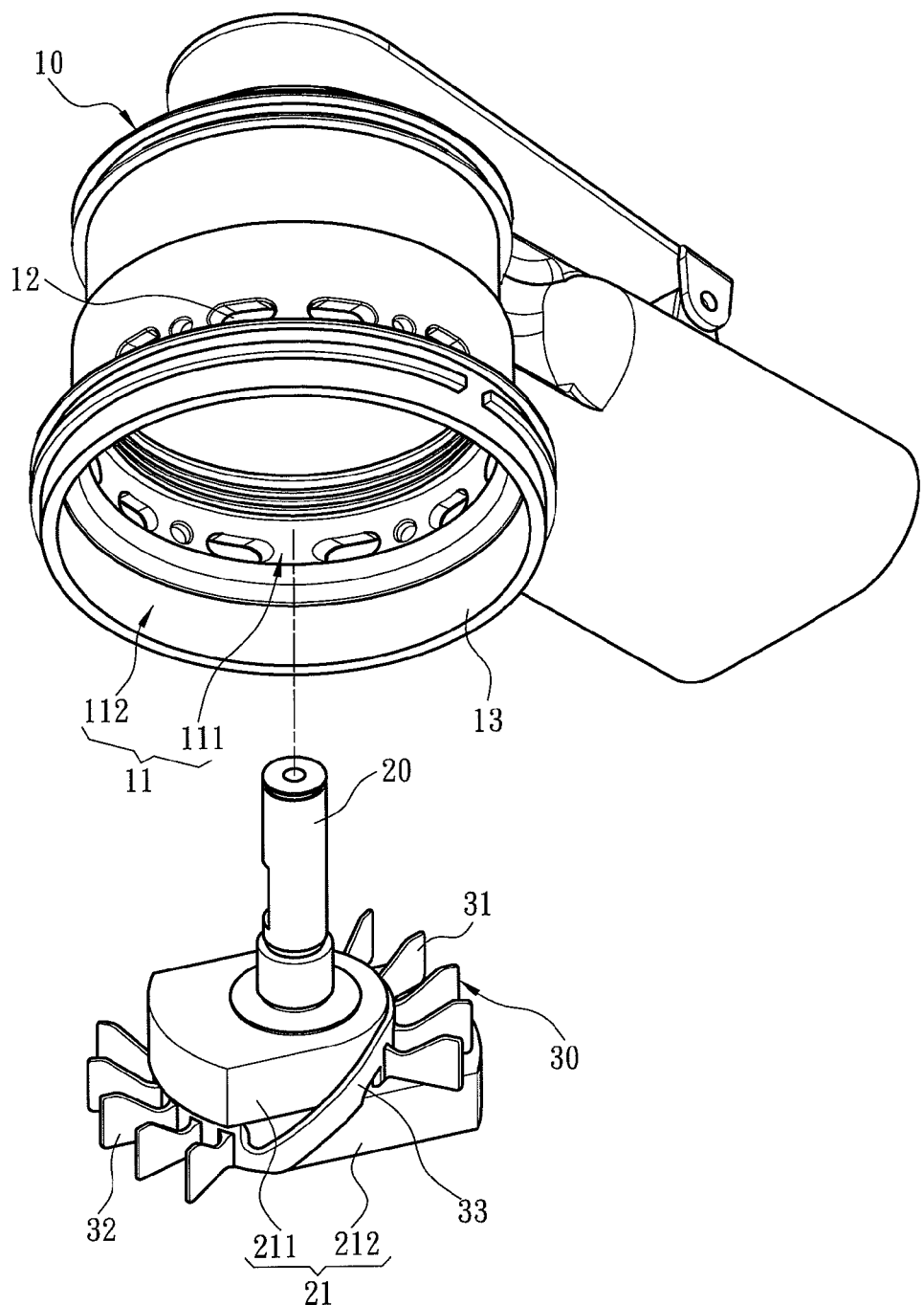
FIG. 2 is another exploded view of the invention.
Figure 3:
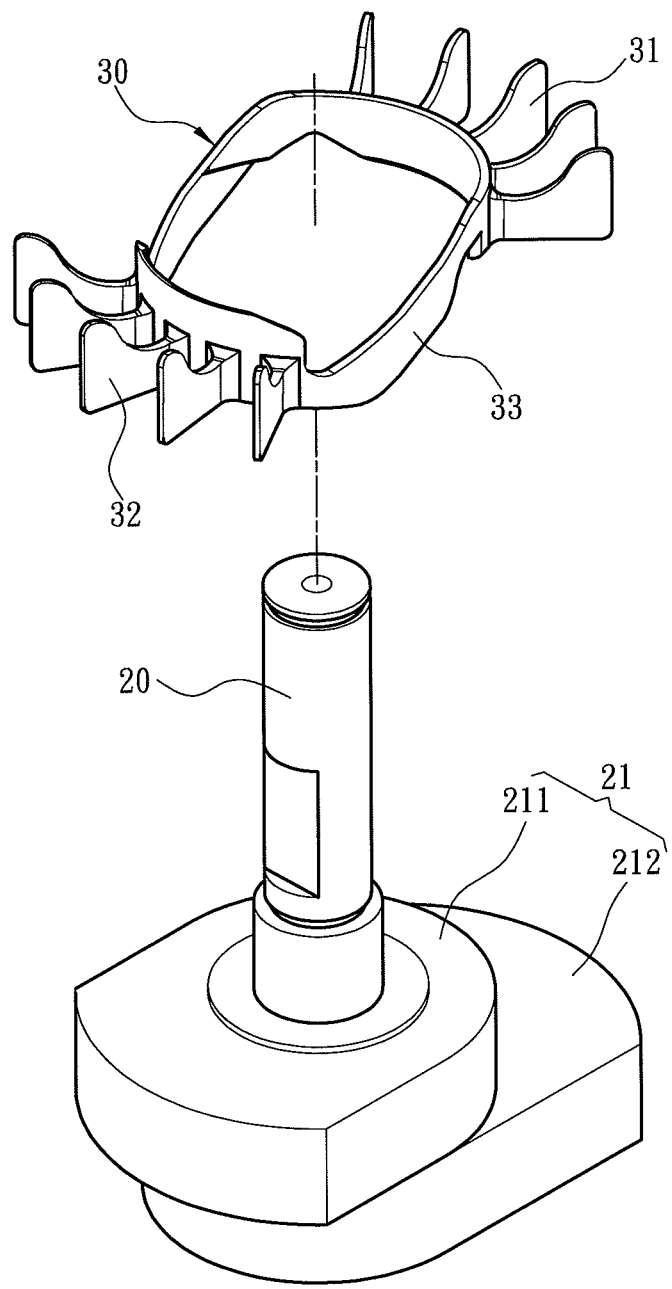
FIG. 3 is yet another exploded view of the invention.

Please refer to FIGS. 1, 2 and 3, the dust proof structure for a machine tool according to the invention includes a machine tool 10. The machine tool 10 includes a housing chamber 11 having an air intake section 111 and an air discharge section 112 communicating with the air intake section 111. The machine tool 10 has a side wall with a plurality of air inlets 12 formed thereon communicating with the air intake section 111, and an air outlet 13 at the bottom communicating with the air discharge section 112. The machine tool 10 also has a spindle 20 in the housing chamber 11 that can be driven to rotate by a driving means (not shown in the drawings), such as a motor, rotor, stator or the like. The spindle 20 is coupled with a balance weight set 21 which includes a first balance weight portion 211 and a second balance weight portion 212 that are overlapped. The first and second balance weight portions 211 and 212 have lateral sides extended outwards so that the spindle 20 rotates in an eccentric manner. The balance weight set 21 also has a flow guiding element 30 which is a fan located thereon that includes a first blade portion 31 located on the first balance weight portion 211 and a second blade portion 32 located on the second balance weight portion 212, and a coupling portion 33 to connect the first blade portion 31 and second blade portion 32. Thus forms the main structure of the invention.

Figure 4:
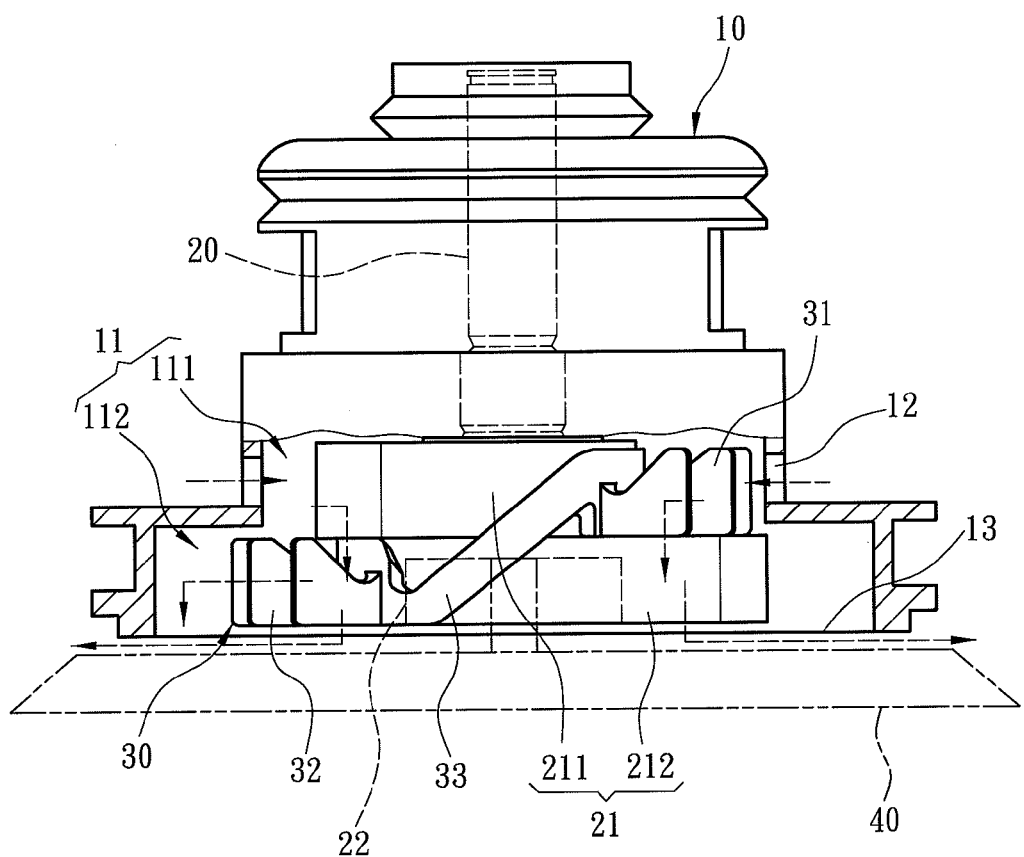
FIG. 4 is a sectional view of the invention.

Referring to FIG. 4, the machine tool 10 can be any machine tool capable of generating eccentric spinning through the spindle 20. As shown in the drawing, the spindle 20 is coupled with an action member 40 outside the air outlet 13, the action member 40 can be a grinding disk. The action member 40 is coupled with the balance weight set 21 through a bearing 22 held in the balance weight set 21. When the machine tool 10 is in operation, the spindle 20 drives the balance weight set 21 to operate, and the flow guiding element 30 also is driven to rotate at the same time by the spindle 20. As the air inlet 12 is located at the same elevation to the first blade portion 31, when the flow guiding element 30 rotates, the first blade portion 31 sucks the external air from outside through the air inlet 12 into the air intake section 111, and the sucked air is first introduced into the first balance weight portion 211 to carry heat generated by the first balance weight portion 211 away, then the air is directed to the air discharge section 112 and the second blade portion 32 located below the first blade portion 31, and is guided to the second balance weight portion 212 to disperse heat thereof; finally, the air is discharged through the air outlet 13 outside the action member 40. Thus heat generated by the balance weight set 21 can be expelled. Moreover, the air is discharged through the air outlet 13 towards the action member 40, hence dust generated by operation of the action member 40 cannot be carried upwards into the machine tool 10 through the air outlet 13, and the bearing 22 near the air outlet 13 (located on the balance weight set 21) is free from dust contamination without suffering damage. Other elements located above the spindle 20 such as rotor, bearing and the like also can be averted from wearing by the dust. As a result, the machine tool 10 can function normally and lifespan thereof improves.

As a conclusion, the machine tool 10 of the invention has a housing chamber 11 to hold a spindle 20, and the housing chamber 11 has an air intake section 111 and an air discharge section 112 communicating with the air intake section 111.

The machine tool 10 also has an air inlet 12 communicating with the air intake section 111 and an air outlet 13 communicating with the air discharge section 112, and an action member 40 coupled to the spindle 20 outside the air outlet 13. The machine tool 10 further has a flow guiding element 30 in the housing chamber 11 to introduce external air through the air inlet 12 to the air intake section 111 while the spindle 20 is operating, and direct the air to the air discharge section 112 to be discharged towards the action member 40 outside the air outlet 13. Therefore, dust generated by operation of the action member 40 does not enter upwards into the machine tool 10, and elements inside the machine tool 10 are not damaged by dust contamination, hence the machine tool 10 can maintain steady operation and has a longer lifespan.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A dust proof machine tool, comprising:
a tool body which includes a housing chamber to hold a spindle, the housing chamber including an air intake section and an air discharge section communicating with the air intake section, the tool body also including an air inlet formed on the air intake section and an air outlet communicating with the air discharge section, the spindle being coupled with an action member outside the air outlet and being coupled with a balance weight set, the balance weight set including a first balance weight portion and a second balance weight portion that overlap with each other; and
a fan located on the balance weight set and located in the housing chamber to introduce external air through the air inlet to the air intake section, and direct the air to the air discharge section to be discharged towards the action member outside the air outlet, the fan including a first blade portion located on the first balance weight portion and a second blade portion located on the second balance weight portion.

2. The dust proof structure of claim 1, wherein the fan further includes a coupling portion to connect the first blade portion and the second blade portion.

3. The dust proof structure of claim 1, wherein the air inlet and the first blade portion are substantially located at a same elevation.

4. The dust proof structure of claim 1, wherein the action member is a grinding disk.

* * * * *